(12) United States Patent
Sieber et al.

(10) Patent No.: US 9,108,510 B2
(45) Date of Patent: Aug. 18, 2015

(54) METHOD AND CONTROL DEVICE FOR CONTROLLING FORESEEABLE HAPTICALLY PERCEIVABLE SIGNALS IN AN ACCELERATION PEDAL OF A MOTOR VEHICLE

(71) Applicant: Robert Bosch GmbH, Stuttgart (DE)

(72) Inventors: Udo Sieber, Bietigheim (DE); Markus Deissler, Neckarsulm (DE); Daniel Henning, Sersheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/361,306

(22) PCT Filed: Oct. 16, 2012

(86) PCT No.: PCT/EP2012/070460
§ 371 (c)(1),
(2) Date: May 29, 2014

(87) PCT Pub. No.: WO2013/087259
PCT Pub. Date: Jun. 20, 2013

(65) Prior Publication Data
US 2014/0330499 A1 Nov. 6, 2014

(30) Foreign Application Priority Data

Dec. 12, 2011 (DE) .......................... 10 2011 088 309

(51) Int. Cl.
*B60K 26/02* (2006.01)
(52) U.S. Cl.
CPC ......... *B60K 26/021* (2013.01); *B60K 2026/022* (2013.01); *Y02T 10/84* (2013.01)
(58) Field of Classification Search
CPC . B60K 26/021; B60K 2026/022; Y02T 10/84
USPC .......... 701/70, 123; 73/488; 200/86.5, 61.89; 338/153; 180/65.265
See application file for complete search history.

(56) References Cited

U.S. PATENT DOCUMENTS

| 5,113,721 A * | 5/1992 | Polly ............................... 477/80 |
| 2007/0198136 A1* | 8/2007 | Kobayashi et al. ............... 701/1 |

FOREIGN PATENT DOCUMENTS

| DE | 25 55 429 A | 6/1977 |
| DE | 199 16 434 A1 | 10/2000 |
| DE | 10 2009 045 710 A1 | 4/2010 |
| EP | 1 707 462 A1 | 10/2006 |
| WO | 2010/130605 A1 | 11/2010 |

OTHER PUBLICATIONS

International Search Report corresponding to PCT Application No. PCT/EP2012/070460, mailed Apr. 10, 2013 (German and English language document) (5 pages).

* cited by examiner

*Primary Examiner* — Marthe Marc-Coleman
(74) *Attorney, Agent, or Firm* — Maginot, Moore & Beck LLP

(57) ABSTRACT

A method and a control device for controlling a haptic acceleration pedal in a motor vehicle includes determining a foreseeable signal position in which a haptically perceivable signal is foreseeably to be generated by the acceleration pedal at a future time. The signal position is configured to be located between a rest position and a maximally actuated position within the shifting range of the pedal. While the pedal is located in a current position between the rest position and the foreseeable position, an actuator that is configured to generate a haptically perceivable signal on the acceleration pedal is arranged in such manner that the actuator is in operational connection with the acceleration pedal when the acceleration pedal has reached the foreseeable position. The configuration results in a prompt generation of a haptically perceivable signal and a reduced energy consumption for the actuator.

7 Claims, 2 Drawing Sheets

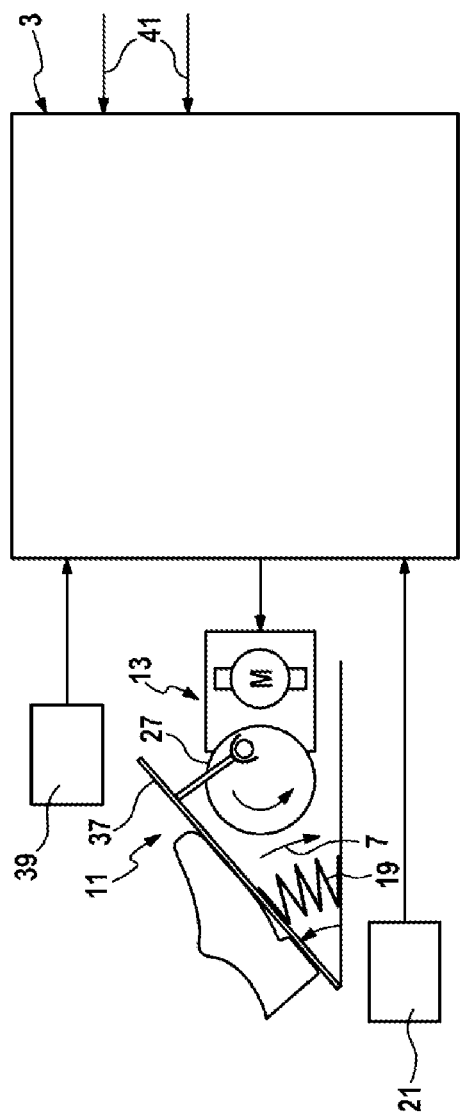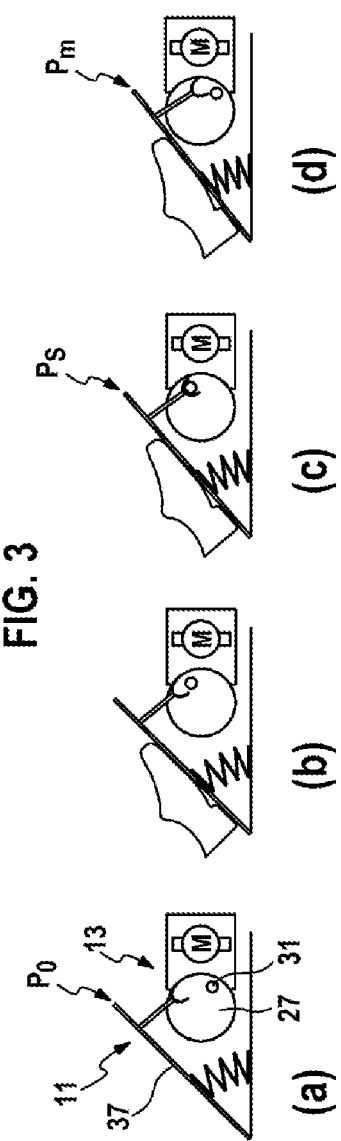

METHOD AND CONTROL DEVICE FOR CONTROLLING FORESEEABLE HAPTICALLY PERCEIVABLE SIGNALS IN AN ACCELERATION PEDAL OF A MOTOR VEHICLE

This application is a 35 U.S.C. §371 National Stage Application of PCT/EP2012/070460, filed on Oct. 16, 2012, which claims the benefit of priority to Serial No. DE 10 2011 088 309.6, filed on Dec. 12, 2011 in Germany, the disclosures of which are incorporated herein by reference in their entirety.

BACKGROUND

The present disclosure relates to a method and to a control device for controlling a haptic accelerator pedal in a motor vehicle. The disclosure also relates to a computer program product which is intended to execute the method according to the disclosure when said computer program product is executed on a programmable control device, and to a computer-readable medium on which such a computer program product is stored.

In modern motor vehicles, the driver is assisted in driving the vehicle by a large amount of information which is made available. For example, it may be helpful to signal feedback about specific driving states to the driver or to signal requests to the driver to carry out certain measures in order to be able to increase the safety when driving or the comfort of the driver or in order to be able to save fuel. This feedback can be made available in different ways, such as for example visually or audibly.

In modern motor vehicles, possibilities for haptic feedback to the driver are also additionally implemented by means of the accelerator pedal of the vehicle. The accelerator pedal is for this purpose equipped with an actuator which makes it possible to apply a force to the accelerator pedal selectively. For example, starting from a certain accelerator pedal position the actuator can selectively counteract further depression of the accelerator pedal in order in this way to signal to a driver, for example, that stronger depression of the accelerator pedal would lead to a disproportionate increase in the consumption of fuel. Alternatively, with the aid of the actuator it is possible to apply to the accelerator pedal a force which varies over time in order to cause said accelerator pedal to oscillate, for example in the form of vibrations or pulsations. In this way, it is possible to communicate to the driver indications and warnings through the haptic perception of said driver or else to provide the driver with comfort functions without the driver being distracted, for example from observing the traffic, by visual or audible signals.

DE 25 55 429 describes a system for generating tactile or haptically perceptible signals in a vehicle.

SUMMARY

The present disclosure permits in its embodiments advantageous actuation of a haptic accelerator pedal in a motor vehicle. In particular, the disclosure can permit brief generation of a haptically perceptible signal in the accelerator pedal, wherein energy consumption for the actuator of the accelerator pedal can be kept low.

In the method proposed here, the haptic accelerator pedal can be moved between a position of rest and a position of maximum actuation within a movement range, and can be excited by means of an actuator to generate a haptically perceptible signal. In this context, a predictable signal position, i.e. a position which can be assumed by the accelerator pedal and at which it can be predicted that the accelerator pedal is to generate a haptically perceptible signal at a future time is first determined. The predictable signal position represents here a position of the accelerator pedal between the position of rest and the position of maximum actuation. While the accelerator pedal is in a current position between the position of rest and the predictable signal position, the actuator is then selectively arranged in such a way that the actuator becomes operatively connected to the accelerator pedal when the accelerator pedal reaches the predictable signal position.

The motivations or ideas on which the actuation method according to the disclosure is based can be considered to be, inter alia, that the actuator of a haptic accelerator pedal is to be actuated as far as possible in such a way that at least haptically perceptible signals, which are to be generated in future and whose occurrence can be predicted, can be generated as far as possible in a short time, that is to say with short response times. In this context, the energy requirement which is necessary for implementing this method is to be kept low.

A "predictable signal position" can be understood here to be a positioning process or a position of the accelerator pedal at which it is possible to predict that certain haptically perceptible signals are to be generated. In other words, the resolution of these specific signals depends, inter alia, on the current position which the accelerator pedal assumes when depressed by the driver. When the accelerator pedal reaches the determined, predictable signal position, the actuator is to be capable of generating a haptically perceptible signal as quickly as possible by applying force to the accelerator pedal.

For example, an important function of a haptic accelerator pedal can be to signal a limit for consumption-favorable operation to a driver when he depresses the accelerator pedal. This may be represented, for example, in the form of a variable pressure point. The predictable signal position can therefore be referred to as a pressure point position. When the accelerator pedal reaches the pressure point position, the actuator is intended to apply an additional restoring force to the accelerator pedal here in order to make further depression of the accelerator pedal difficult.

In order to ensure that, independently of the speed at which the driver depresses the accelerator pedal, the pressure point is actually generated in near to real-time conditions when there is a risk of a disproportionate increase in the fuel consumption when the accelerator pedal is depressed further, the actuator should be capable of applying its force to the accelerator pedal within a few milliseconds.

This could be ensured, for example, by a suitable fixed mechanical coupling between the actuator and the lever of the accelerator pedal. Such coupling could, however, bring about, on actuation of the accelerator pedal, unacceptable effects, for example relating to inertia owing to difficulty of movement in the case of strong acceleration of the accelerator pedal lever or relating to a ripple in the pedal force profile owing, for example, to magnetic cogging torques of the electric motor.

In order to reduce or eliminate these effects, suitable follow-on position control could be used for the actuator. However, this could result in an increased energy requirement due to continuous movement of the actuator in synchronism with the accelerator pedal.

In order to avoid these disadvantages it is now proposed to arrange the actuator generally in such a way that it becomes operatively connected to the accelerator pedal at an intermediate position within the movement range of the accelerator pedal. In other words, the actuator is not to be coupled continuously to the accelerator pedal or is not to be located outside the movement range of the accelerator pedal in periods of time in which no generation of a haptically perceptible signal is required and is only be moved for a specifically requested signal generation process and be placed in an operative connection to the accelerator pedal. Instead, during a time period in which no haptically perceptible signals are to be currently generated the actuator is already to be arranged at a position at which it is assumed that a haptically perceptible signal is to be generated at a future time when the accelerator pedal reaches this position.

The predictable signal position can be here, for example, exclusively within a partial range of between 5% and 95%, preferably between 15% and 85%, of the entire movement range of the accelerator pedal. In other words, the predictable signal position can be in a central region at a distance from both the position of rest and the position of maximum actuation of the accelerator pedal, for example 30% above and below the geometric center between these two extreme positions.

Arranging the actuator for an operative connection to the accelerator pedal in such an intermediate position permits the predictable haptically perceptible signal to be generated very quickly when the accelerator pedal reaches the predictable signal position since at this time there is already mechanical contact between the actuator and the accelerator pedal or at least only very short travel of the actuator is necessary to bring about such contact. On the other hand, the accelerator pedal can move freely in a movement partial range between the position of rest and the predictable signal position without the accelerator pedal being influenced by the actuator since at this time there is no operative connection to the actuator.

The predictable signal position can be dependent on a driving situation or dependent on an operating state of the vehicle and can therefore vary over time. The arrangement of the actuator can be continuously adapted here to the predictable signal position which varies over time.

For example, in the case of a configuration of the variable pressure point, described above, for signaling a fuel-saving driving behavior, the pedal position above which fuel consumption would rise disproportionately can depend on a large number of external influencing factors. Examples of this may be an operating state of the engine, an engaged gear speed, a positive or a negative gradient of the route being currently travelled on etc. As a function of such external influencing factors it is therefore possible to determine at which position of the accelerator pedal the variable pressure point which is brought about by the actuator, that is to say the increase in an opposing force acting on the accelerator pedal which is to be brought about by the actuator is to start in order to define the predictable signal position in this way.

Since the external influencing factors, and therefore the predictable signal position, can vary over time, the arrangement of the actuator can be correspondingly adjusted. For this purpose, suitable position control of the actuator can be provided. The energy consumption of said position control may be relatively low since the location of the predictable signal position generally changes slowly at most. In other words, the actuator does not have to be continuously moved and consume energy as is the case, for example, in position follow-on control in which the actuator follows a current position of the accelerator pedal, but instead the actuator can rest in a fixed intermediate position over long periods of time. Only if the predictable signal position changes owing to a change in the external influencing factors is the arrangement of the actuator correspondingly adapted.

If a haptically perceptible signal is to be generated owing to an unpredicted event, the adaptation of the arrangement of the actuator to the predictable signal position can be temporarily interrupted and the actuator can be temporarily actuated in such a way that at that particular time it becomes operatively connected to the accelerator pedal in order to generate the haptically perceptible signal.

In other words, it may be necessary also to generate other haptically perceptible signals in addition to the predictable signal requests whose triggering can be dependent, in particular, on the current position of the accelerator pedal.

For example, a warning function can be provided to signal haptically to the driver if, owing to a bend lying ahead or an entry to a location, the driver's foot is to be taken off the accelerator pedal, wherein such a haptic signal is to be generated independently of the current position of the accelerator pedal.

In such cases, the actuator can temporarily be moved into an operative connection to the accelerator pedal. In this context it may be advantageous that the actuator is not previously arranged in a position of rest outside the movement range of the accelerator pedal and therefore has to be moved a long way to the current position of the accelerator pedal but instead is already located in an intermediate position within the movement range, as a result of which the travel to the current position of the accelerator pedal and therefore a response period until the generation of the haptically perceptible signal can be shortened.

The embodiments of methods according to the disclosure described above and the functionalities and advantages which can be achieved therewith can be implemented by a control device which is provided in a vehicle and has the purpose of controlling the haptic accelerator pedal.

For this purpose, the control device can be configured here to output, via suitable interfaces, control signals to a drive motor contained in the actuator. Furthermore, the control device can have interfaces in order to be able to receive, for example from suitable sensors, information about a current position of the accelerator pedal and/or about forces applied to the accelerator pedal.

Furthermore, interfaces can be provided in order, for example, to be able to read in influencing parameters which can be relevant for determining the predictable signal position. For example, an interface can be provided with an engine control device with the aid of which it is possible to detect which operating state the engine is in and when the consumption of fuel by the engine would increase massively with stronger actuation of the accelerator pedal.

The control device can implement the proposed control method and any information evaluations of sensor signals as hardware and/or software. It may be advantageous to program a programmable control device for the execution of the method described above. For this purpose, a computer program product can have computer-readable instructions which instruct the programmable control device to carry out the steps of the respective method. The computer program product can be stored on a computer-readable medium such as, for example, a CD, a DVD, a flash memory, a ROM, an EPROM or the like. In order to be able to actuate correctly the arrangement which is to be assumed by the actuator, it is possible, in addition to the processing of further sensor data, also to use information stored in a database or in the form of characteristic curves and relating to a reaction behavior of the actuator to certain control signals.

It is noted that possible features and advantages of embodiments of the disclosure are described herein partially with reference to a method according to the disclosure and partially with reference to a control device according to the disclosure. A person skilled in the art will recognize that the individual features can be suitably combined with one another or interchanged, in particular they can be transferred from the control device to the method, and vice versa, in order to be able to arrive in this way at further embodiments and possible synergy effects.

BRIEF DESCRIPTION OF THE DRAWINGS

Embodiments of the disclosure are described below with reference to the appended drawings. Neither the description nor the drawings are intended to be interpreted as restricting the disclosure here.

FIG. 2 shows a haptic accelerator pedal with a control device according to an embodiment of the present disclosure; and FIGS. 3 (a)-(d) illustrate various operating states of a haptic accelerator pedal which is controlled according to the disclosure.

Figure 1:
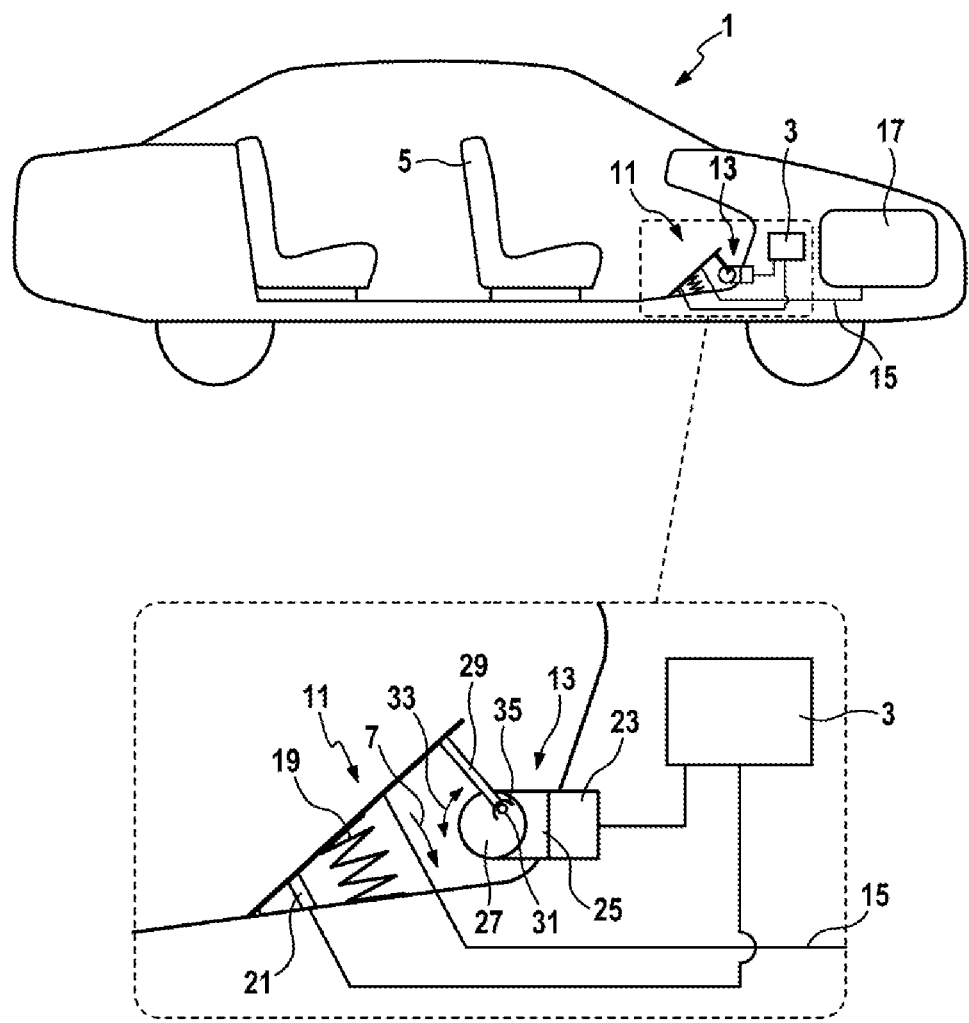
FIG. 1 shows a motor vehicle with a control device for carrying out a method according to an embodiment of the present disclosure.

The figures are merely schematic and not true to scale.

DETAILED DESCRIPTION

FIG. 1 shows a sectional view of a vehicle 1 with a haptic accelerator pedal 11. By depressing the accelerator pedal it is possible for a driver sitting on a seat 5 to cause an engine 17 of the vehicle 1 to accelerate the vehicle via a Bowden cable 15 or a line (not illustrated) which is connected to an engine control device. To do this, the driver must depress the accelerator pedal 11 in the direction of the arrow 7, as a result of which the accelerator pedal 11 can be moved from a position of rest along a movement range to a position of maximum actuation. A position sensor 21 can determine here the current position of the accelerator pedal 11. A spring 19 prestresses the accelerator pedal toward the position of rest counter to the actuation direction 7.

The accelerator pedal 11 is configured as a haptic accelerator pedal. For this purpose, the accelerator pedal 11 has an actuator 13 which can be used to move the accelerator pedal 11 in a desired direction counter to the actuation direction 7, or apply force thereto. In this context, the actuator 13 can excite the accelerator pedal 11 to experience oscillations, for example in the form of vibrations or pulsations. Alternatively, the actuator 13 can apply a force to the accelerator pedal 11 which can make further depression of the accelerator pedal 11 more difficult and therefore can be perceived by a driver as a pressure point during the actuation of the accelerator pedal 11.

The actuator 13 can be operated with a direct current motor 23 which is coupled to an actuation disk 27 via a gear mechanism 25. By actuating the motor 23 it is possible to rotate the actuation disk 27 in or counter to the clockwise direction, as indicated by the arrow 33. A cam 31 is provided on the actuation disk 27, in an off-center region. This cam 31 can interact with a plunger 29 which is provided on the accelerator pedal 11. For this purpose, the plunger 29 has, at its end directed toward the actuator 13, a fork-shaped receptacle 35 into which the cam 31 can engage as soon as the actuation disk 27 has been rotated into a corresponding position.

Alternatively, the actuator can also be configured as a direct drive, for example with a torque motor, as a result of which large forces can be generated even without a gear mechanism.

The actuator 13 is actuated by a control device 3. The control device 3 detects when a haptically perceptible signal is to be transmitted to a driver via the pedal 11, in order to inform him, for example, of the possibility of a fuel-saving driving style or of a hazardous situation.

Certain indications or haptic signals can depend here in a predictable way on an assumed position of the accelerator pedal.

For example, the control device 3 can determine from available information about a current driving situation and/or a current operating state of the vehicle the movement partial range in which the accelerator pedal 11 can be moved without excessive consumption of fuel occurring, and at what position within the movement range of the accelerator pedal further depression of the accelerator pedal leads to excessively increased consumption of fuel. This position can be defined as a "predictable signal position".

When this determined predictable signal position is reached, the actuator is to apply an additional force to the accelerator pedal 11 in order to signal a pressure point to the driver and as a result prompt him not to depress the accelerator pedal further and therefore to save fuel.

In order to be able to transmit this force to the accelerator pedal 11 in conditions which are as close as possible to real time, the actuator 13 is positioned, already before the accelerator pedal reaches the signal position, in such a way that when the signal position is reached an operative connection occurs between the accelerator pedal 11 and the actuator 13. In the illustrated example this means that the motor 23 positions the actuation disk 27 in such a way that the cam 31 is rotated into a signal position at which the accelerator pedal 11 enters into contact with the receptacle 35, provided on the mechanical plunger 29, just when further depression of the accelerator pedal would result in increased consumption of fuel, and therefore an opposing force is to be applied to the accelerator pedal 11 by the actuator 13 in order to signal a pressure point.

FIG. 2 shows schematically the design of a pedal system with a haptic accelerator pedal 11 and an associated control device 3 according to an embodiment of the disclosure. Various actuation states of the pedal system are illustrated in FIGS. 3(a)-(d).

A pedal lever 37 can be depressed by a driver's foot. The restoring spring 19 brings about an opposing force here in order to move the pedal lever 37 into its position of rest $P_0$, as illustrated in FIG. 3(a).

An actuator 13 and the pedal lever 37 are coupled mechanically only on one side for reasons of safety, that is to say the actuator 13 can only apply restoring forces to the pedal lever 37 counter to the actuation direction 7, and is not capable of moving the pedal lever 37 away from its position of rest $P_0$.

The current position of the pedal lever 37 is detected by means of a pedal position sensor 21, for example in the form of a suitable position sensor or angle sensor. The signal of the pedal position sensor 21 can be fed to a position control circuit, provided in the control device 3, of the actuator 13.

An actuator position sensor 39 can detect the current arrangement of the actuator 13 and pass it on to the control device 3. For example, a current orientation of the actuation disk 27 can be detected.

Even though this is not illustrated in FIG. 2 in detail, the control device 3 can have a data processing unit and, if appropriate, a data storage unit. The latter can process and, if appropriate, buffer data from the actuator position sensor 39 and the pedal position sensor 21 and also from other information sources which supply information to the control device 3 via interfaces 41.

For example, information from an engine control device can be passed on to the control device 3 of the haptic accelerator pedal 11 via the interfaces 41, by means of which information it is possible to detect whether the engine 17 would consume disproportionately more fuel given a further increased power demand as a result of an accelerator pedal 11 which was depressed further by means of a specific pedal position.

After the determination of a pedal position P, at which a haptically perceptible signal is to be generated in a predictable fashion, the control device 3 can actuate the actuator 13 to assume an arrangement in which it becomes operatively connected to the accelerator pedal 11 at the determined signal position $P_s$, and can therefore apply a force to the accelerator pedal 11.

Starting from the position of rest illustrated in FIG. 3(a) at which the lever 37 of the pedal 11 is, for example, at the start of travelling into the position of rest $P_0$ and the actuation disk 27 of the actuator 13 is in a position of rest in which the cam is outside the movement range of the accelerator pedal 11, the actuator 13 can rotate its actuation disk 27 into an intermediate position as illustrated in FIG. 3(b). This intermediate position is between the position of rest $P_0$ and a position $P_m$ of maximum actuation and corresponds to a position at which the actuator 13 is to become operatively connected to the accelerator pedal 11 via the cam 31, as illustrated in FIG. 3(c), in order to generate in a predictable fashion a haptically perceptible signal, for example in the form of an opposing force acting on the accelerator pedal 11. If the driver depresses the accelerator pedal 11 further despite the haptically perceptible signal having been output, the force which is applied by the actuator 13 can be increased further until a preset maximum limit is reached. When this limit is exceeded, the actuator 13 can reduce the force applied to the accelerator pedal 11 and for this purpose move back, for example, into the position of rest, as illustrated in FIG. 3(d). This makes it possible for the accelerator pedal 11 to be depressed into the position $P_m$ of maximum actuation without further force brought about by the actuator 13.

The invention claimed is:

1. A method for controlling a haptic accelerator pedal in a motor vehicle, the accelerator pedal being configured to be moved between a position of rest and a position of maximum actuation within a movement range and being configured to be excited by an actuator to generate a haptically perceptible signal, the method comprising:
   determining a predictable signal position at which the accelerator pedal is predicted to generate a haptically perceptible signal at a future time, the predictable signal position being located between the position of rest and the position of maximum actuation, and
   arranging the actuator, while the accelerator pedal is in a current position between the position of rest and the predictable signal position, in such a way that the actuator becomes operatively connected to the accelerator pedal when the accelerator pedal reaches the predictable signal position.

2. The method as claimed in claim 1, wherein the predictable signal position is configured to be exclusively within a partial range of between 5% and 95% of the entire movement range of the accelerator pedal.

3. The method as claimed in claim 1, wherein the predictable signal position changes as a function of one or more of a driving situation and an operating state of the vehicle, and wherein the arrangement of the actuator is continuously adapted to the predictable signal position that varies over time.

4. The method as claimed in claim 3, wherein the adaptation of the arrangement of the actuator to the predictable signal position is temporarily interrupted if a haptically perceptible signal is to be generated due to an unpredicted event and the actuator is temporarily arranged in such a way that at that particular time it becomes operatively connected to the accelerator pedal to generate the haptically perceptible signal.

5. The method as claimed in claim 1, wherein the predictable signal position is a pressure point position and the actuator applies an additional restoring force to the accelerator pedal to make further depression of the accelerator pedal more difficult when the accelerator pedal reaches the pressure point position.

6. A control device for controlling a haptic accelerator pedal in a motor vehicle, the acceleration pedal being configured to be (i) moved between a position of rest and a position of maximum actuation within a movement range and (ii) excited by an actuator to generate a haptically perceptible signal, the control device being configured to carry out a method including:
   determining a predictable signal position at which the accelerator pedal is predicted to generate a haptically perceptible signal at a future time, the predictable signal position being located between the position of rest and the position of maximum actuation, and
   arranging the actuator, while the accelerator pedal is in a current position between the position of rest and the predictable signal position, in such a way that the actuator becomes operatively connected to the accelerator pedal when the accelerator pedal reaches the predictable signal position.

7. A computer program product stored in a non-transitory computer readable medium, the computer program product having computer-readable instructions that instruct a programmable control device to carry out a method for controlling a haptic accelerator pedal in a motor vehicle, the acceleration pedal being configured to be (i) moved between a position of rest and a position of maximum actuation within a movement range and (ii) excited by an actuator to generate a haptically perceptible signal, the method including:
   determining a predictable signal position at which the accelerator pedal is predicted to generate a haptically perceptible signal at a future time, the predictable signal position being located between the position of rest and the position of maximum actuation, and
   arranging the actuator, while the accelerator pedal is in a current position between the position of rest and the predictable signal position, in such a way that the actuator becomes operatively connected to the accelerator pedal when the accelerator pedal reaches the predictable signal position.

* * * * *